United States Patent
Fujita et al.

(10) Patent No.: US 11,801,849 B2
(45) Date of Patent: Oct. 31, 2023

(54) VEHICLE CONTROL DEVICE, VEHICLE CONTROL METHOD, AND VEHICLE CONTROL SYSTEM

(71) Applicant: Hitachi Astemo, Ltd., Ibaraki (JP)

(72) Inventors: Haruhiko Fujita, Hitachinaka (JP); Daisuke Goto, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 17/792,263

(22) PCT Filed: Jan. 13, 2021

(86) PCT No.: PCT/JP2021/000796
§ 371 (c)(1),
(2) Date: Jul. 12, 2022

(87) PCT Pub. No.: WO2021/145335
PCT Pub. Date: Jul. 22, 2021

(65) Prior Publication Data
US 2023/0042441 A1    Feb. 9, 2023

(30) Foreign Application Priority Data
Jan. 17, 2020   (JP) ................................. 2020-005812

(51) Int. Cl.
*B60K 23/04*   (2006.01)
*B60W 10/192*   (2012.01)
(Continued)

(52) U.S. Cl.
CPC .......... *B60W 50/029* (2013.01); *B60K 23/04* (2013.01); *B60T 8/885* (2013.01); *B60T 8/92* (2013.01);
(Continued)

(58) Field of Classification Search
CPC .. B60K 23/04; B60K 2023/046; B60K 17/16; B60K 17/165; B60W 2710/18;
(Continued)

(56) References Cited

U.S. PATENT DOCUMENTS 5,573,312 A * 11/1996 Muller .................... B60L 3/102
303/189
6,120,115 A *  9/2000 Manabe .......... B60W 30/18127
303/162

FOREIGN PATENT DOCUMENTS

CN    104163170 A  * 11/2014 ............ B60T 13/588
JP        06297975 A  * 10/1994 .......... B60T 8/17616
JP     2006-105170       4/2006

OTHER PUBLICATIONS

International Search Report dated Mar. 30, 2021 in corresponding International Application No. PCT/JP2021/000796, with English language translation.
(Continued)

*Primary Examiner* — Tinh Dang
(74) *Attorney, Agent, or Firm* — Wenderoth, Lind & Ponack, L.L.P.

(57) ABSTRACT

An electrically controlled differential gear is disposed between a right front wheel and a left front wheel of a vehicle. The electrically controlled differential gear includes a clutch mechanism that limits a differential operation of the electrically controlled differential gear. A second ECU (control portion) obtains information as to failure associated with actuation of a right front electric brake mechanism. The second ECU obtains a physical amount relating to a required braking force which is applied to the left front wheel and the right front wheel. The second ECU outputs a differential limiting control command for limiting the differential operation of the electrically controlled differential gear to the clutch mechanism (or more specifically, a differential ECU
(Continued)

that controls the clutch mechanism) based on the information as to the failure and the physical amount relating to the required braking force.

12 Claims, 6 Drawing Sheets

(51) Int. Cl.
*B60W 50/029* (2012.01)
*F16H 48/20* (2012.01)
*B60W 50/02* (2012.01)
*F16H 48/22* (2006.01)
*B60W 10/12* (2012.01)
*B60W 10/184* (2012.01)
*B60T 8/92* (2006.01)
*B60T 8/88* (2006.01)
*B60T 13/74* (2006.01)
*B60T 17/18* (2006.01)
*B60W 10/16* (2012.01)
*B60W 30/18* (2012.01)

(52) U.S. Cl.
CPC .............. *B60T 13/74* (2013.01); *B60T 17/18* (2013.01); *B60W 10/16* (2013.01); *B60W 10/184* (2013.01); *B60W 30/18109* (2013.01); *F16H 48/20* (2013.01); *B60T 2220/03* (2013.01); *B60T 2220/04* (2013.01); *B60T 2250/04* (2013.01); *B60T 2270/402* (2013.01); *B60T 2270/406* (2013.01); *B60W 2050/0297* (2013.01); *B60W 2510/18* (2013.01); *B60W 2520/10* (2013.01); *B60W 2540/18* (2013.01); *B60W 2710/12* (2013.01); *B60W 2710/18* (2013.01); *F16H 2048/205* (2013.01)

(58) Field of Classification Search
CPC ....... B60W 2710/125; B60W 2710/12; B60W 2540/18; B60W 2520/10; B60W 2510/18; B60W 50/029; B60W 10/16; B60W 10/184; B60W 30/18109; B60W 2050/0297; B60W 50/02; B60W 10/12; B60W 30/02; F16D 2125/36; F16D 2121/24; F16D 65/183; F16D 55/226; B60T 8/885; B60T 8/92; B60T 13/74; B60T 17/18; B60T 2220/03; B60T 2220/04; B60T 2250/04; B60T 2270/402; B60T 2270/406; B60T 8/26; B60T 13/741; B60T 7/042; B60T 8/329; B60T 13/662; B60T 17/22; F16H 48/20; F16H 2048/205; F16H 2048/204; F16H 48/22; B60Y 2300/84
See application file for complete search history.

(56) References Cited

OTHER PUBLICATIONS

Written Opinion of the International Searching Authority dated Mar. 30, 2021 in corresponding International Application No. PCT/JP2021/000796, with English language translation.

* cited by examiner

VEHICLE CONTROL DEVICE, VEHICLE CONTROL METHOD, AND VEHICLE CONTROL SYSTEM

TECHNICAL FIELD

The present disclosure relates, for example, to vehicle control devices, vehicle control methods, and vehicle control systems.

BACKGROUND ART

Patent Literature 1 discloses an electric brake device including a caliper with a caliper body inside which a motor and a ball ramp mechanism are mounted. The ball ramp mechanism converts the rotation of the motor into linear motion and transfers the linear motion to a piston. The electric brake device actuates the ball ramp mechanism according to the rotation of the motor to propel the piston and presses brake pads against a disc rotor to generate a braking force.

CITATION LIST

Patent Literature

PTL 1: Japanese Patent Application Publication (Kokai) No. 2006-105170

SUMMARY OF INVENTION

Technical Problem

With regard to an electric brake device (electric brake mechanism) like the one disclosed in Patent Literature 1, for example, if a motor is provided with a dual system for redundancy, it may increase component costs.

An object of one embodiment of the invention is to provide a vehicle control device, a vehicle control method, and a vehicle control system which secure function of redundancy in an electric brake mechanism, and yet restrain a component cost increase.

Solution to Problem

Provided is a vehicle control device according to one embodiment of the invention. The vehicle control device comprises a control portion disposed in a vehicle and configured to perform calculation based on inputted information and output a calculation result. The vehicle includes a differential device disposed between a first drive wheel of the vehicle and a second drive wheel of the vehicle; a differential limiting mechanism configured to limit a differential operation of the differential device; a first electric brake mechanism configured to propel a first braking member by means of a first motor to apply a braking force to the first drive wheel; and a second electric brake mechanism configured to propel a second braking member by means of a second motor to apply a braking force to the second drive wheel. The control portion obtains information as to failure associated with actuation of the first electric brake mechanism, obtains a physical amount relating to a required braking force which is applied to the first drive wheel and the second drive wheel, and outputs a differential limiting control command for limiting a differential operation of the differential device to the differential limiting mechanism based on the information as to the failure and the physical amount relating to the required braking force.

Further provided is a vehicle control method for a vehicle according to one embodiment of the invention. The vehicle includes a differential device disposed between a first drive wheel of the vehicle and a second drive wheel of the vehicle; a differential limiting mechanism configured to limit a differential operation of the differential device; a first electric brake mechanism configured to propel a first braking member by means of a first motor to apply a braking force to the first drive wheel; and a second electric brake mechanism configured to propel a second braking member by means of a second motor to apply a braking force to the second drive wheel. The vehicle control method obtains information as to failure associated with actuation of the first electric brake mechanism, obtains a physical amount relating to a required braking force which is applied to the first drive wheel and the second drive wheel, and outputs a differential limiting control command for limiting a differential operation of the differential device to the differential limiting mechanism based on the information as to the failure and the physical amount relating to the required braking force.

Further provided is a vehicle control system according to one embodiment of the invention. The vehicle control system comprises a differential device disposed between a first drive wheel of a vehicle and a second drive wheel of the vehicle; a differential limiting mechanism configured to limit a differential operation of the differential device; a first electric brake mechanism configured to propel a first braking member by means of a first motor to apply a braking force to the first drive wheel; a second electric brake mechanism configured to propel a second braking member by means of a second motor to apply a braking force to the second drive wheel, and a controller configured to obtain information as to failure associated with actuation of the first electric brake mechanism, obtain a physical amount relating to a required braking force which is applied to the first drive wheel and the second drive wheel, and output a differential limiting control command for limiting a differential operation of the differential device to the differential limiting mechanism based on the information as to the failure and the physical amount relating to the required braking force.

According to one embodiment of the invention, it is possible to secure function of redundancy in an electric brake mechanism and yet restrain a component cost increase.

DESCRIPTION OF EMBODIMENTS

Explanations are given below with regard to a vehicle control device, a vehicle control method, and a vehicle control system according to embodiments with reference to the attached drawings, taking as an example a case where the vehicle control device, method, and system are installed in a four-wheeled vehicle. The letter "S" represents each step of a flow diagram of FIG. 3 (for example, Step 1 is represented as "S1"). Lines with two slashes in FIGS. 1 and 2 indicate power lines. A capital "L" or an "l" as a subscript means "left side," and a capital "R" or an "r" as a subscript means "right side." A capital "F" or an "f" as a subscript means "front side." A capital "R" or an "r" as a subscript also means "rear side."

Figure 1:
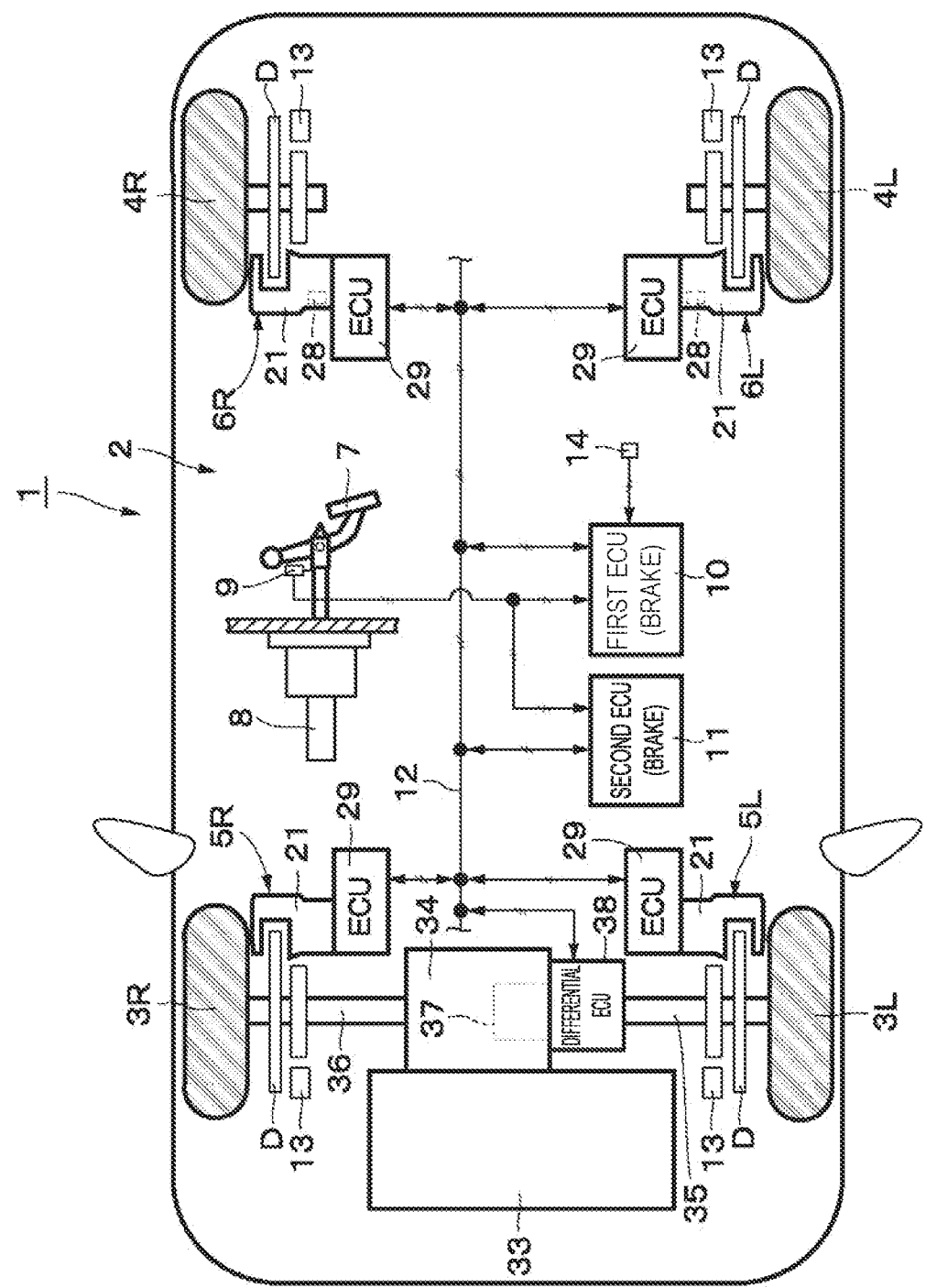
FIG. 1 is a schematic view of a vehicle installed with a vehicle control device and a vehicle control system according to an embodiment.

FIG. 1 shows a vehicle system. In FIG. 1, a vehicle 1 is installed with a brake device 2 (brake system) that applies a braking force to wheels 3, 4 (front wheels 3L, 3R, and rear wheels 4L, 4R) to brake the vehicle 1. The brake device 2 comprises right and left front wheel-side electric brake mechanisms 5L, 5R (front brake mechanisms) disposed correspondingly to a left-side front wheel 3L and a right-side front wheel 3R; right and left rear wheel-side electric brake mechanisms 6L, 6R (rear brake mechanisms) disposed correspondingly to a left-side rear wheel 4L and a right-side rear wheel 4R; a brake pedal 7 (operation tool) functioning as a brake operation member; a pedal simulator 8 that generates a kickback reaction force in response to operation (depression) of the brake pedal 7; and a pedal stroke sensor 9 functioning as an operation detection sensor which measures an amount of operation on the brake pedal 7 by an operator (driver).

The right and left front wheel-side electric brake mechanisms 5L, 5R and the right and left rear wheel-side electric brake mechanisms 6L, 6R (hereinafter, referred to also as electric brake mechanisms 5, 6) comprise, for example, electrically-driven disc brakes. To be specific, the electric brake mechanisms 5, 6 apply braking forces to wheels 3, 4 (front wheels 3L, 3R and rear wheels 4L, 4R) by activation of electric motors 23 (see FIG. 2). In this case, the right and left rear wheel-side electric brake mechanisms 6L, 6R include parking mechanisms 28.

The pedal stroke sensor 9 is connected to a first brake control ECU 10 and a second brake control ECU 11. Each of the first and second brake control ECUs 10 and 11 functions as an ECU (Electronic Control Unit) for controlling a brake. The first brake control ECU 10 (referred to also as a first ECU 10) and the second brake control ECU 11 (referred to also as a second ECU 11) are disposed in the vehicle 1. The first ECU 10 and the second ECU 1I each comprise a microcomputer including a central processing unit (CPU), a memory unit (memory), a control board and the like, and correspond to a vehicle control device and a controller. The first ECU 10 and the second ECU 11 receive signals from the pedal stroke sensor 9 and calculate braking forces (target braking forces) to be applied to the wheels (four wheels) according to a predetermined control program.

The first ECU 10 computes the target braking forces to be applied, for example, to the right-side front wheel 3R and the left-side rear wheel 4L. The first ECU 10, based on the computed target braking forces, outputs (transmits) brake commands (target thrust forces) for the two wheels, namely the right-side front wheel 3R and the left-side rear wheel 4L, to electric brake ECUs 29, 29 through a CAN 12 (Controller Area Network) functioning as a vehicle data bus. The second ECU 11 computes the target braking forces to be applied, for example, to the left-side front wheel 3L and the right-side rear wheel 4R. The second ECU 11, based on the computed target braking forces, outputs (transmits) brake commands (target thrust forces) for the two wheels, namely the left-side front wheel 3L and the right-side rear wheel 4R, to the electric brake ECUs 29, 29 through the CAN 12. In order to implement the aforementioned control relating to the braking, the first ECU 10 and the second ECU 11 include control portions 10A, 11A (FIG. 2) that perform calculation based on inputted information (for example, signals from the pedal stroke sensor 9) and outputs calculation results (brake commands, for example).

Disposed near the front wheels 3L, 3R and the rear wheels 4L, 4R are wheel speed sensors 13, 13 that detect speeds (wheel speeds) of the wheels 3L, 3R, 4L, 4R. The wheel speed sensors 13, 13 are connected to the first ECU 10 and the second ECU 11. The first ECU 10 and the second ECU 11 are capable of obtaining the wheel speeds of the wheels 3L, 3R. 4L, 4R based on signals transmitted from the wheel speed sensors 13, 13. The first ECU 10 and the second ECU 11 receive vehicle information that is transmitted through the CAN 12 from another ECU (for example, an aftermentioned prime mover control ECU, an electrically controlled differential gear control ECU 38, or similar ECU) that is installed in the vehicle 1. For example, the first ECU 10 and the second ECU 11 are capable of obtaining, through the CAN 12, various kinds of vehicle information including information as to automatic transmission range positions or manual transmission shift positions, information as to an on/off state of an ignition switch, information as to rotational speed of an engine, information as to power train torque, information of a transmission gear ratio, information as to operation of a steering wheel, information as to clutch operation, information as to operation of an acceleration pedal, information as to vehicle-to-vehicle communication, information as to environment around a vehicle which is obtained by a vehicle-mounted camera, information as to an acceleration sensor (longitudinal acceleration and lateral acceleration), and similar information.

A parking brake switch 14 is disposed near an operator's seat. The parking brake switch 14 is connected to the first ECU 10 (and to the second ECU 11 through the CAN 12). The parking brake switch 14 transfers signals (actuation request signals) to the first ECU 10 and the second ECU 11 which correspond to parking brake actuation requests (Apply request which demands to maintain a braked state, and Release request which demands to release the braked state) responding to operation commands of the operator. The first ECU 10 and the second ECU 1I transmit parking brake commands for the two rear wheels to the electric brake ECUs 29, 29 based on operation of the parking brake switch 14 (actuation request signals). The parking brake switch 14 corresponds to a switch that actuates the parking mechanisms 28.

The right and left front wheel-side electric brake mechanisms 5L, 5R (hereinafter, referred to also as an electric brake mechanism 5) each include a brake mechanism 21 and the electric brake ECU 29. The right and left rear wheel-side electric brake mechanisms 6L, 6R (hereinafter, referred to also as an electric brake mechanism 6) each include a brake mechanism 21, the parking mechanism 28 functioning as a braking force maintaining mechanism, and the electric brake ECU 29. The electric brake mechanism 5 is configured in the same manner as the electric brake mechanism 6, except not including the parking mechanism 28.

Figure 2:
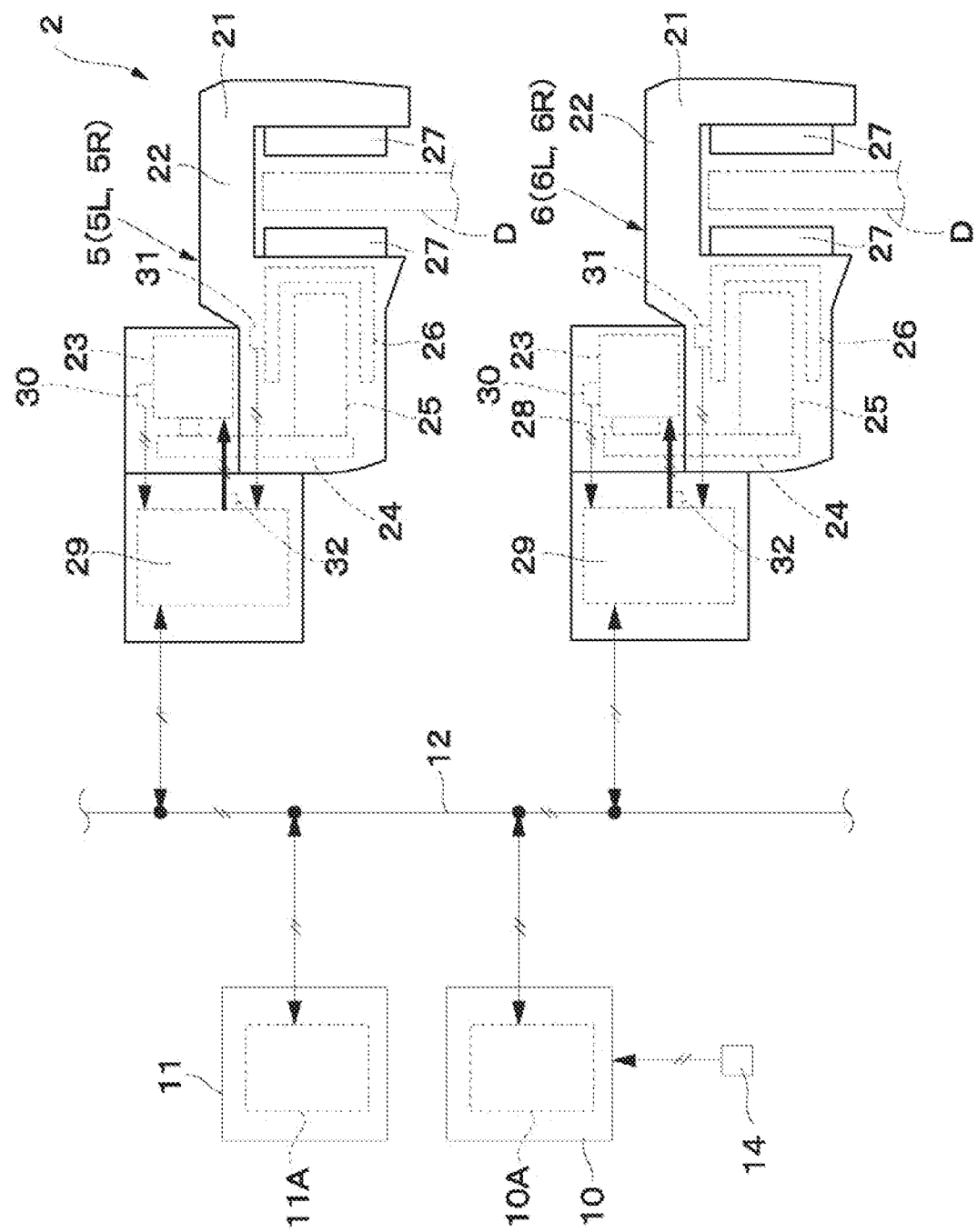
FIG. 2 is a schematic view of a front wheel-side brake mechanism, a rear wheel-side brake mechanism, a first ECU, and a second ECU which are shown in FIG. 1.

The electric brake mechanisms 5, 6 implement position control and thrust force control on the brake mechanisms 21. To that end, as shown in FIG. 2, the brake mechanisms 21 each include a rotational angle sensor 30 functioning as position detection means that detects a motor rotational position, a thrust force sensor 31 functioning as thrust force detection means that detects a thrust force (piston thrust force), and a current sensor 32 functioning as current detection means that detects motor current.

The brake mechanisms 21 are disposed in the right and left wheels of the vehicle 1. That is, the brake mechanisms 21 are respectively disposed on the left front wheel 3L side, the right front wheel 3R side, the left rear wheel 4L side, and the right rear wheel 4R side. The electric motors 23 are disposed in the respective brake mechanisms 21. As shown in FIG. 2, the brake mechanisms 21 each include, for example, a caliper 22 functioning as a cylinder (wheel cylinder), a piston 26 functioning as a pressing member, and brake pads 27 functioning as braking members (pads). Each of the brake mechanisms 21 is further provided with the electric motor 23 functioning as an electrically driven motor (electric actuator), a speed reduction mechanism 24, a rotary-linear motion conversion mechanism 25, and a fail-open mechanism (return spring), not shown. The electric motor 23 is activated (rotated) by electric power supply and propels the piston 26. The electric motor 23 thus applies a braking force. The electric motor 23 is controlled by the electric brake ECU 29 according to the brake command (target thrust force) transmitted from the first ECU 10 or the second ECU 11. The speed reduction mechanism 24 slows and transfers the rotation of the electric motor 23 to the rotary-linear motion conversion mechanism 25.

The rotary-linear motion conversion mechanism 25 converts the rotation of the electric motor 23 which is transferred through the speed reduction mechanism 24 into an axial displacement (linear displacement) of the piston 26. The piston 26 is propelled by activation of the electric motor 23, to thereby move the brake pad 27. The brake pad 27 is pressed by the piston 26 against a disc rotor D functioning as a braked member (disc). The disc rotor D rotates with the wheels 3L, 3R, 4L and 4R. At the application of braking, the return spring (fail-open mechanism), not shown, applies a rotational force acting in a brake release direction to a rotary member of the rotary-linear motion conversion mechanism 25. In the brake mechanism 21, the piston 26 is propelled by activation of the electric motor 23 to press the brake pad 27 against the disc rotor D. In other words, according to the brake request (brake command), the brake mechanism 21 transfers a thrust force generated by activation of the electric motor 23 to the piston 26 that moves the brake pad 27.

The parking mechanisms 28 are respectively disposed in the left-side (left rear wheel 4L-side) brake mechanism 21 and the right-side (right rear wheel 4R-side) brake mechanism 21. The parking mechanism 28 maintains a propelled state of the piston 26 of the brake mechanism 21. In other words, the parking mechanism 28 maintains and releases the braking force. The parking mechanism 28 maintains the braking force by engaging with part of the brake mechanism 21. For example, the parking mechanism 28 comprises a ratchet mechanism (lock mechanism) that brings an engaging claw (lever member) into engagement (locking engagement) with a gear (ratchet gear), to thereby hamper (lock) the rotation of the gear. In this case, the engaging claw is engaged with the gear, for example, by activation of a solenoid that is controlled by the first ECU 10, the second ECU 11, and the electric brake ECU 29. This hampers the rotation of a rotary shaft of the electric motor 23 and maintains the braking force.

The electric brakes ECU 29 are disposed in the respective brake mechanisms 21, 21. That is, the electric brakes ECU 29 are disposed correspondingly to the left front wheel 3L-side brake mechanism 21, the right front wheel 3R-side brake mechanism 21, the left rear wheel 4L-side brake mechanism 21, and the right rear wheel 4R-side brake mechanism 21. The electric brake ECU 29 comprises a microcomputer and a driving circuit (inverter, for example). The electric brake ECU 29 controls the brake mechanism 21 (electric motor 23) according to the command from the first ECU 10 or the second ECU 11. The electric brake ECU 29 on the rear wheel side further controls the parking mechanism 28 (solenoid) according to the command from the first ECU 10 or the second ECU 11. In other words, the electric brakes ECU 29, together with the first ECU 10 and the second ECU 11, form a control device (brake control device) that controls the actuation of the electric motors 23 (and the parking mechanisms 28). In this case, the electric brake ECU 29 controls the activation of the electric motor 23 according to the brake request (target thrust force). The electric brake ECU 29 on the rear wheel side controls the activation of the parking mechanism 28 (solenoid) according to an actuate command. A signal corresponding to the brake command and a signal corresponding to the actuate command are inputted from the first ECU 10 or the second ECU 11 to the electric brake ECU 29.

The rotational angle sensor 30 detects a rotational angle (motor rotational angle) of the rotary shaft of the electric motor 23. The rotational angle sensor 30 is disposed in the corresponding electric motor 23 of each of the brake mechanisms 21 and forms position detection means that detects a rotational position (motor rotational position) of the electric motor 23 and therefore a piston position. The thrust force sensor 31 detects a reaction force against a thrust force (pressure) applied from the piston 26 to the brake pad 27. The thrust force sensor 31 is disposed in the corresponding brake mechanism 21 and forms thrust force detection means that detects a thrust force (piston thrust force) acting on the piston 26. The current sensor 32 detects current (motor current) supplied to the electric motor 23. The current sensor 32 is disposed in the corresponding electric motor 23 of each of the brake mechanisms 21 and forms current detection means that detects motor current (motor torque current) of the electric motor 23. The rotation angle sensor 30, the thrust force sensor 31, and the current sensor 32 are connected to the electric brake ECU 29.

The electric brakes ECU 29 (and the first ECU 10 and the second ECU 11 which are connected to the electric brakes ECU 29 through the CAN 12) are capable of obtaining the rotational angles of the electric motors 23 based on the signals transmitted from the rotational sensors 30. The electric brake ECUs 29 (and the first ECU 10 and the second ECU 11) are capable of obtaining the thrust forces acting on the pistons 26 based on the signals transmitted from the thrust force sensors 31. The electric brake ECUs 29 (and the first ECU 10 and the second ECU 11) are capable of obtaining the motor currents supplied to the electric motors 23 based on the signals transmitted from the current sensors 32.

Operations of braking application and release which are performed by the electric brake mechanisms 5, 6 will be now explained. The following explanation refers to, as an example, operation that is performed when the operator operates the brake pedal 7. A substantially similar operation is performed when an automatic brake is operated, except that, for example, a command of the automatic brake is outputted from an automatic brake ECU, not shown, the first ECU 10 or the second ECU 11 to the electric brake ECU 29.

For example, if the operator steps on the brake pedal 7 while driving the vehicle 1, each of the first ECU 10 and the second ECU 11 outputs a command according to depression of the brake pedal 7 (for example, the target thrust force corresponding to a brake application command) to the electric brake ECU 29 based on a detected signal inputted from the pedal stroke sensor 9. The electric brake ECU 29 activates (rotates) the electric motor 23 in a positive direction, that is, a brake application direction (apply direction) based on the command from the first ECU 10 or the second ECU 11. The rotation of the electric motor 23 is transferred through the speed reduction mechanism 24 to the rotary-linear motion conversion mechanism 25, and the piston 26 advances toward the brake pad 27.

The brake pad 27 is then pressed against the disc rotor D. and a braking force is applied. At this point, the activation of the electric motor 23 is controlled according to the detected signals from the pedal stroke sensor 9, the rotational angle sensor 30, the thrust force sensor 31 and the like, to thereby establish a braked state. When the braking is being applied in the aforementioned manner, the rotary member of the rotary-linear motion conversion mechanism 25, and therefore the rotary shaft of the electric motor 23, are applied with a force acting in a brake release direction by the return spring, not shown, which is disposed in the brake mechanism 21.

When the brake pedal 7 is operated to a depression release side, the first ECU 10 and the second ECU 11 output commands according to the foregoing operation (for example, target thrust forces corresponding to the brake release commands) to the electric brake ECUs 29. According to the command from the first ECU 10, the electric brake ECU 29 activates (rotates) the electric motor 23 in a reverse direction, that is, the brake release direction (release direction). The rotation of the electric motor 23 is transferred through the speed reduction mechanism 24 to the rotary-linear motion conversion mechanism 25. The piston 26 is retreated away from the brake pad 27. When the depression of the brake pedal 7 is completely released, the brake pads 27 move away from the disc rotor D, and the braking force is released. In such anon-braked state after the braking is released, the return spring, not shown, which is disposed in the brake mechanism 21 is restored to an initial state.

The following explanation refers to thrust force control and position control which are implemented by the electric brake mechanisms 5, 6.

The first ECU 10 and the second ECU 11 obtain the braking forces to be generated by the electric brake mechanisms 5, 6, that is, the target thrust forces to be generated by the pistons 26 based on detection data, automatic brake commands, and the like from various kinds of sensors (including pedal stroke sensor 9, for example). The first ECU 10 and the second ECU 11 output the target thrust forces serving as the brake commands to the electric brake ECUs 29. In order to generate the target thrust forces by the corresponding pistons 26, the electric brake ECUs 29 implement the thrust force control and position control on the electric motors 23. The thrust force control uses a piston thrust force detected by the thrust force sensor 31 as feedback, and the position control uses a motor rotational position detected by the rotational angle sensor 30 as feedback.

In other words, the thrust forces of the pistons 26 in the brake mechanisms 21 are adjusted based on feedback signals from the thrust force sensors 31 that measure the thrust forces of the pistons 26 according to the braking force commands (target thrust forces) transmitted from the first ECU 10 and the second ECU 11. To determine the thrust forces, the brake mechanisms 21 implement torque control of the electric motors 23 through the rotary-linear motion conversion mechanisms 25 and the speed reduction mechanisms 24, that is, current control based on the feedback signals of the current sensors 32 that measure current amounts flowing through the electric motors 23. There is correlation among the braking force, the piston thrust force, the torque (motor torque) of the electric motor 23, a current value, and the piston position (a rotational speed measurement value of the electric motor 23 which is obtained by the rotational angle sensor 30). However, there is dispersion in braking force which is resulted from variation of environment and components, so that it is preferable that the braking force be implemented by the thrust force sensor 31 that estimates piston pressure which is strongly correlated with the braking force.

The thrust force sensor 31 receives a force acting in a thrust direction of the piston 26, deforms a metal strain element, and detects a strain amount of the metal strain element. A strain sensor is a strain IC. The strain sensor involves a piezoresistor that detects a strain at a center of an upper surface of a silicon chip, and also involves a Wheatstone bridge, an amplifying circuit, and a semiconductor process on the periphery of the piezoresistor. The strain sensor, based on a piezoresistive effect, judges a strain applied to the strain sensor as a resistance change. The strain sensor may comprise a strain gauge or the like.

As shown in FIG. 1, the vehicle 1 comprises a prime mover 33 functioning as a power source for obtaining a thrust force of the vehicle 1, and an electrically controlled differential gear 34 functioning as a differential device that is disposed between the right front wheel 3R of the vehicle 1 and the left front wheel 3L of the vehicle 1. The prime mover 33 may comprise, for example, an engine (internal combustion engine) alone or may comprise an engine and an electric motor or an electric motor alone. The prime mover 33 outputs a driving force (rotation) for moving the vehicle 1. The prime mover 33 comprises the prime mover control ECU, not shown, for controlling the prime mover 33. The prime mover control ECU is connected to the CAN 12. The driving force (rotation) of the prime mover 33 is transferred through a speed reducer, not shown, the electrically controlled differential gear 34 and the like to the right and left front wheels 3L, 3R functioning as drive wheels.

The embodiment is explained on a premise that the right front wheel 3R of the vehicle 1 is a first drive wheel of the vehicle 1, and the left front wheel 3L of the vehicle 1 is a second drive wheel of the vehicle 1. However, the left front wheel 3L and the right front wheel 3R may be the first and second drive wheels, respectively. The embodiment is further explained on a premise that the electric brake mechanism 5R located on the right front wheel 3R side of the vehicle 1 is a first electric brake mechanism, and the electric brake mechanism 5L located on the left front wheel 3L side of the vehicle 1 is a second electric brake mechanism. However, the left front wheel 3L-side electric brake mechanism 5L may be the first electric brake mechanism, and the right front wheel 3R-side electric brake mechanism 5R may be the second electric brake mechanism. The right front wheel 3R-side electric brake mechanism 5R that is the first electric brake mechanism propels the right front wheel 3R-side brake pad 27 that is a first braking member by means of the right front wheel 3R-side electric motor 23 that is a first motor, to thereby apply a braking force to the right front wheel 3R that is the first drive wheel. The left front wheel 3L-side electric brake mechanism 5L that is the second electric brake mechanism propels the left front wheel 3L-side brake pad 27 that is a second braking member by means of the left front wheel 3L-side electric motor 23 that is a second motor, to thereby apply a braking force to the left front wheel 3L that is the second drive wheel. In the embodiment, the "right side" is referred to as "first," and the "left side" as "second." However, the "right side" and the "left side" may be referred to as "second" and "first," respectively.

The electrically controlled differential gear 34 transfers the rotation that is slowed down by the speed reducer mission, not shown, from the prime mover 33 to a left axle shaft 35 connected to the left front wheel 3L and a right axle shaft 36 connected to the right front wheel 3R. In this case, the electrically controlled differential gear 34 includes a clutch mechanism 37 that fastens the left axle shaft 35 and the right axle shaft 36. The clutch mechanism 37 is a differential limiting mechanism (LSD: Limited Slip Differential) that limits a differential operation of the electrically controlled differential gear 34, that is, a speed difference (difference in rotational speed) between the left axle shaft 35 and the right axle shaft 36. The clutch mechanism 37 corresponds, for example, to an LSD coupling including a friction plate, an actuator and the like. The electrically controlled differential gear 34 thus comprises an open differential gear and an LSD coupling.

The electrically controlled differential gear 34 adjusts a fastening amount (fastening rate) of the clutch mechanism 37, or a direct coupling rate between the axle shafts 35 and 36, to thereby adjust (limit) a speed difference between the right and left front wheels 3L and 3R in a variable manner. The electrically controlled differential gear 34 includes an electrically controlled differential gear control ECU 38 (referred to also as a differential ECU 38) configured to control the fastening amount (fastening rate) of the clutch mechanism 37 that fastens the axle shafts 35, 36. The differential ECU 38 is connected to the first ECU 10 and the second ECU 11 through the CAN 12. The first ECU 10 and the second ECU 11 each can transmit a command as to the fastening amount (fastening rate) to the differential ECU 38 through the CAN 12.

The following discussion refers as an example to a case in which autonomous driving is performed at an autonomous driving level 3 or higher. In this case, it is preferable that, if failure occurs in one line in the brake system, a sufficient braking force (for example, a deceleration of 0.65 G or more) be secured as a remaining braking force from other lines. For example, in a case of a four-wheel vehicle with an X-type dual circuit hydraulic brake system, when one line fails, the vehicle is braked only with two diagonal wheels, and a maximum theoretical braking force is, for example, 0.5 G. To secure a deceleration of, for example, 0.65 G or more as the remaining braking force at failure in one line, it is necessary that the braking forces of three of the four wheels be retained.

Assuming now that the four wheels are controlled with an electric brake mechanism, for example, if a brake control ECU is provided with two lines for redundancy, it is necessary to activate three electric brake mechanisms with a single ECU, which may lead to complication and cost increase. For example, if front wheel-side electric brake mechanisms are constructed in a redundant manner, and for example, if the electric brake mechanisms are of a twin-piston type, two sets of pistons, rotary-linear motion converters, speed reducers, motors, and inverters are necessary. This also may lead to complication and cost increase.

In this light, the embodiment utilizes a separate system, namely, the electrically controlled differential gear 34. In the embodiment, specifically, a sufficient braking force is secured at failure in one line through coordination with the separate system (electrically controlled differential gear 34) in which the right and left axle shafts 35, 36 are fastened by the clutch mechanism 37. In other words, the embodiment locks the differential gear at failure of diagonal wheels to secure the braking force and thus ensures compatibility between the securement of redundancy in the electric brake and the repression of a component cost increase. Details will be discussed below.

According to the embodiment, the vehicle 1 includes the front wheel-side electric brake mechanisms 5L, 5R, the electrically controlled differential gear 34, and the clutch mechanism 37. The front wheel-side electric brake mechanisms 5L, 5R form a vehicle control system together with the electrically controlled differential gear 34, the clutch mechanism 37 and the first ECU 10 and/or the second ECU 11.

The control portion 10A of the first ECU 10 outputs calculation results (brake commands, for example) to the electric brake ECU 29 (right front electric brake ECU 29) of the "right front wheel 3R-side electric brake mechanism 5R (right front electric brake mechanism 5R)" and the electric brake ECU 29 (left rear electric brake ECU 29) of the "left rear wheel 4L-side electric brake mechanism 6L (left rear electric brake mechanism 6L)." The control portion 11A of the second ECU 11 outputs calculation results (brake commands, for example) to the electric brake ECU 29 (left front electric brake ECU 29) of the "left front wheel 3L-side electric brake mechanism 5L (left front electric brake mechanism 5L)" and the electric brake ECU 29 (right rear electric brake ECU 29) of the "right rear wheel 4R-side electric brake mechanism 6R (right rear electric brake mechanism 6R)."

In the embodiment, as described above, the control portion 10A of the first ECU 10 is used to control the right front electric brake mechanism 5R and the left rear electric brake mechanism 6L, and the control portion 11A of the second ECU 11 is used to control the left front electric brake mechanism 5L and the right rear electric brake mechanism 6R. In this case, if a failure occurs which is associated with actuation of the right front electric brake mechanism 5R and the left rear electric brake mechanism 6L, for example, due to malfunction of the first ECU 10 or the like, and if such a situation is left as it is, the braking forces of the right front wheel 3R and the left rear wheel 4L fail, and therefore, only the braking forces of the left front wheel 3L and the right rear wheel 4R work.

In general, when braking is applied to an FF vehicle having a front-engine, front-wheel-drive layout, a normal force (load) is applied to the right and left front wheels 3L, 3R and the right and left rear wheels 4L, 4R at a ratio of 0.7 to 0.3, respectively, where a total vehicle weight is 1. If one line fails, therefore, either one of the front wheels 3L, 3R and either one of the rear wheels 4L, 4R cannot obtain a friction braking force between tires and a road surface. There is a possibility that the only friction braking force (friction coefficient) that can be obtained is a braking force (deceleration) of, for example, 0.5 G (4.9 m/s$^2$) at a maximum.

To solve this, in the embodiment, the electrically controlled differential gear 34 (axle shafts 35, 36) is fastened so that the braking force may be generated with a failed wheel to which the normal force is applied. In this way, control for increasing the braking force is implemented through the coordination with the separate system (electrically controlled differential gear 34) in which the right and left axle shafts 35, 36 are fastened by the clutch mechanism 37. As a result, when calculated with respect to an ideal braking force distribution (a front wheel to rear wheel ratio is 7 to 3) for a front heavy FF vehicle, the remaining braking force at failure in one line is improved from 0.5 G (0.35 G in one front line and 0.15 G in one rear line) to 0.85 G (0.35 G×2 in two front lines and 0.15 G in one rear line) as a theoretical braking force.

According to the embodiment, therefore, the first ECU 10 (or more specifically, the control portion 10A) implements vehicle control as below. The first ECU 10 (control portion 10A) obtains information as to failure associated with actuation of the left front electric brake mechanism 5L. The information as to failure includes not only information as to a control failure at which the left front electric brake mechanism 5L is out of control, for example, due to malfunction of the second ECU 11, but also information as to other failures than the control failure which include a mechanical failure (failure in a machine) in the left front electric brake mechanism 5L. In short, the information as to failure covers all kinds of failures in the left front electric brake mechanism 5L. The first ECU 10 (control portion 10A) obtains a physical amount relating to required braking forces to be applied to the left front wheel 3L and the right front wheel 3R. The required braking forces include, for example, a required braking force that is generated by an automatic brake command during autonomous driving as well as a required braking force generated by the operator's brake operation. For example, the physical amount relating to the required braking force is obtained based on a physical amount relating to operation amount of the brake pedal 7 disposed in the vehicle 1. In other words, the required braking force can be obtained on the basis of a stroke amount (pedal displacement amount) based on a stroke signal of the pedal stroke sensor 9. With a pedal force sensor, the required braking force can be obtained as a physical amount relating to the required braking force based on a pedal force detected by the pedal force sensor. Furthermore, the required braking force can be obtained on the basis of an automatic brake command value (target deceleration, for example) generated by automatic brake.

The first ECU 10 (control portion 10A) outputs a differential limiting control command for limiting a differential operation of the electrically controlled differential gear 34 to the clutch mechanism 37 (or more specifically, the differential ECU 38 that controls the clutch mechanism 37) based on the information as to the failure and the physical amount (stroke amount, for example) relating to the required braking force. This allows the first ECU 10 (control portion 10A) to apply the braking force generated by the right front electric brake mechanism 5R not only to the right front wheel 3R but also to the left front wheel 3L through the electrically controlled differential gear 34 (clutch mechanism 37). At this time, in other words, when the information as to the failure is obtained, the first ECU 10 (control portion 10A) outputs a control command for controlling the electric motor 23 of the right front electric brake mechanism 5R so that a thrust force of the brake pads 27 of the right front electric brake mechanism 5R relative to the stroke amount is larger than a thrust force (pressure) of the brake pads 27 of the right front electric brake mechanism 5R relative to the stroke amount when the information as to the failure is not obtained. For example, when the required braking force is large (stroke amount is large), and the vehicle runs straight, the right front electric brake mechanism 5R can apply a braking force that is twice as large as a required braking force in normal time (when there is no failure) and can realize a 100% differential limitation (fastening amount) of the electrically controlled differential gear 34.

The second ECU 11 (control portion 11A) implements vehicle control as below. The second ECU 11 (control portion 11A) obtains information as to failure associated with actuation of the right front electric brake mechanism 5R. The information as to failure includes not only information as to a control failure at which the right front electric brake mechanism 5R is out of control, for example, due to malfunction of the first ECU 10, but also information as to other failures than the control failure which include a mechanical failure (failure in a machine) in the right front electric brake mechanism 5R. In short, the information as to failure covers all kinds of failures in the left front electric brake mechanism 5L. The second ECU 11 (control portion 11A) obtains a physical amount (stroke amount, for example) relating to required braking forces to be applied to the right front wheel 3R and the left front wheel 3L. The second ECU 11 (control portion 11A) outputs a differential limiting control command for limiting a differential operation of the electrically controlled differential gear 34 to the clutch mechanism 37 (or more specifically, the differential ECU 38 that controls the clutch mechanism 37) based on the information as to the failure and the physical amount (stroke amount, for example) relating to the required braking force. In this case, the second ECU 11 (control portion 11A) makes a thrust force of the brake pads 27 of the left front electric brake mechanism 5L relative to the physical amount (stroke amount, for example) relating to the required braking force larger than when the information as to the failure is not obtained (for example, twice larger than in normal time).

When the aforementioned braking is performed in coordination with the electrically controlled differential gear 34, it is desirable for smooth braking to distribute the braking force so as not to generate yaw moment in the vehicle. This is because, if yaw moment (yaw rate) is generated, the operator (driver) or an autonomous driving high-order system has to correct the vehicle by steering, which may cause a feeling of discomfort.

Figure 3:
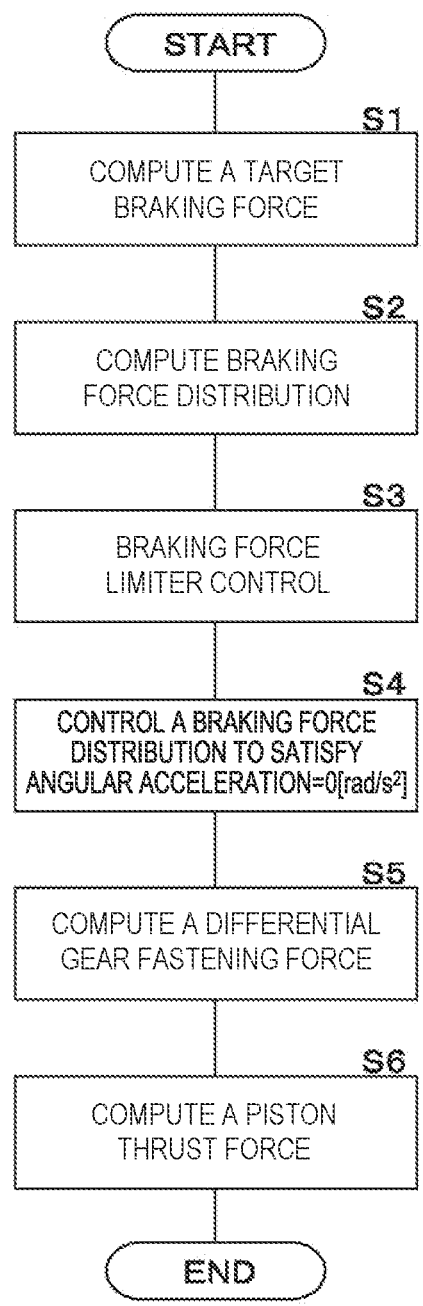
FIG. 3 is a flow diagram of control processing that is performed by the first ECU or the second ECU.

FIG. 3 shows a control flow for securing a braking force by fastening the electrically controlled differential gear 34 and securing vehicle stability at the same time. The embodiment will be explained, taking as an example a case in which malfunction of the first ECU 10 causes failure associated with actuation of the right front electric brake mechanism 5R (and the left rear electric brake mechanism 6L). In other words, the flow diagram (flowchart) of FIG. 3 will be explained as control processing that is performed in the second ECU 11 (control portion 11A) in the event of failure associated with actuation of the right front electric brake mechanism 5R due to malfunction of the first ECU 10 or another reason. In this connection, the same control processing is performed in the event of failure associated with actuation of the left front electric brake mechanism 5L (and the right rear electric brake mechanism 6R) due to malfunction of the second ECU 11 or another reason. In such a case, the control processing in FIG. 3 is performed in the first ECU 10 (control portion 10A), and the braking force of the right front electric brake mechanism 5R is applied not only to the right front wheel 3R but also to the left front wheel 3L through the electrically controlled differential gear 34 (clutch mechanism 37).

The control processing in FIG. 3 which is performed by the control portion 11A of the second ECU 11 begins in response to generation of failure associated with actuation of the right front wheel 3R-side electric brake mechanism 5R, S1 computes the target braking force. In other words, in the event of malfunction of the first ECU 10, a pedal depression amount is detected by the stroke sensor 9 if the operator steps on the brake pedal 7. A signal of the pedal stroke sensor 9 is received by the second ECU 11 that is in normal function through the CAN 12. The second ECU 11 may receive a signal of the automatic brake command of the automatic brake (AD/ADAS) through the CAN 12. In S1, the second ECU 11 computes the target braking force (target deceleration) based on a received sensor signal value (or a signal value of the automatic brake which is received from a high-order controller, such as an autonomous driving ECU or the like).

The processing advances to S2 after S1. S2 calculates pitching or the like of the vehicle 1 based on specifications of the vehicle 1 and computes the braking force distribution between the front side and the rear side. The subsequent S3 implements braking force limiter control based on road surface environment and the like. In other words, S2 and S3 determine the braking force distribution between the front wheel 3L, 3R side and the rear wheel 4L, 4R side according to a limited slip ratio in view of load displacement or the like of the vehicle 1, and compute limited slip deceleration of each of the wheels 3L, 3R, 4L and 4R based on the braking force distribution. For example, the braking force distribution is so determined that a ratio of the front wheel 3L, 3R side to the rear wheel 4L, 4R side is 7 to 3. On a dry road, the limited slip of one of the front wheels 3L, 3R is set to 0.35 G, and the limited slip of one of the rear wheels 4L, 4R is set to 0.15 G. The limited slip can be adjusted depending on a road surface condition or the like. For example, on a wet road, the limited slip can be set smaller than on the dry road.

Figure 4:
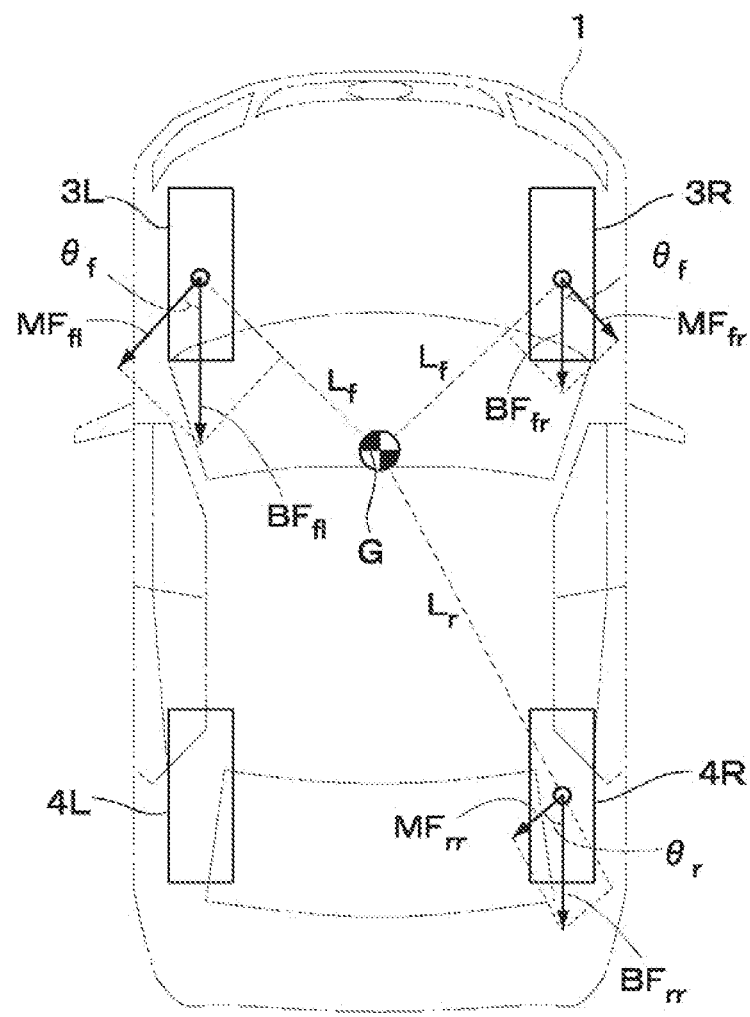
FIG. 4 is an explanatory view (view of a vehicle seen from above) showing relationship between a braking force of a vehicle and a turning force based on the braking force.

The processing advances to S4 after S3. In order not to generate yaw rate in the vehicle 1, S4 sets "anticlockwise rotational angular acceleration produced by the braking force of the left front wheel 3L around a central axis G of the vehicle 1" and "clockwise rotational acceleration produced by the braking forces of the right front wheel 3R and the right rear wheel 4R around the central axis G of the vehicle 1" to zero. FIG. 4 is an explanatory view (plan view of the vehicle 1 seen from above) showing the braking force of the vehicle 1 and moment based on this braking force. As shown in FIG. 4, distance from the central axis G to the front wheels 3L, 3R is denoted by "Lf," and distance from the central axis G to the rear wheels 4L, 4R is denoted by "Lr." In this case, anticlockwise moment "MFfl" around the central axis G (FIG. 4) of the vehicle 1 is expressed by "MFfl=BFfl×COS θfxLf." where "BFfl" is the braking force of the left front wheel 3L. Clockwise moment "MFfr" around the central axis G of the vehicle 1 is expressed by "MFfr=BFfr×COS θfxLf," where "BFfr" is the braking force of the right front wheel 3R. Clockwise moment "MFrr" around the central axis G of the vehicle 1 is expressed by "MFrr=BFrr×COS θrxLr," where "BFrr" is the braking force of the right rear wheel 4R. In order not to generate yaw rate in the vehicle 1, a formula of mathematical 1 needs to be satisfied so that the anticlockwise moment "MFfl" and the clockwise moments "MFfr" and "MFrr" cancel each other out. It is simply necessary that the right-hand moment equals the left-hand moment.

$$BF\!f\!l \times \cos\theta\!f\!\times\!Lf = BF\!f\!r \times \cos\theta\!f\!\times\!Lf + BF\!rr \times \cos\theta r\!\times\!Lr \quad \text{[Mathematical 1]}$$

Figure 5:
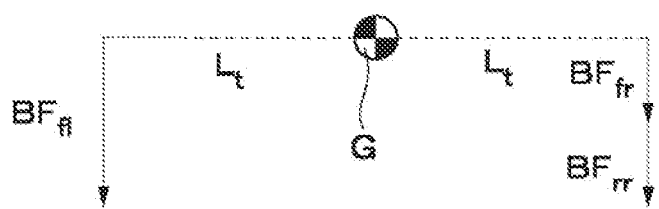
FIG. 5 is a simplified explanatory view showing relationship between the braking force and the turning force in FIG. 4.

If the formula of Mathematical 1 is simplified, a formula of Mathematical 2 is obtained. As shown in FIG. 5, if a vehicle width distance from the central axis G to the left wheels 3L, 4L is Lt, and a vehicle width distance from the central axis G to the right wheels 3R, 4R is Lt, the formula of Mathematical 1 becomes the formula of Mathematical 2. It is simply necessary that the sum of the left brake forces (braking forces) equals the sum of the right brake forces (braking forces) when FIG. 4 is applied to FIG. 5 with equivalent representation.

$$BF\!f\!l = BF\!f\!r + BF\!rr \quad \text{[Mathematical 2]}$$

The sum of the braking forces "BFfl," "BFfr," and "BFrr" is a target braking force "BF." The target braking force "BF" is therefore expressed by a formula of Mathematical 3.

$$BF\!f\!l + BF\!f\!r + BF\!rr = BF \quad \text{[Mathematical 3]}$$

An ideal braking force distribution ratio "S" is "front wheel-side braking force/rear wheel-side braking force." A formula of Mathematical 4 is therefore established.

$$(BF\!f\!l + BF\!f\!r)/BF\!rr = \delta \quad \text{[Mathematical 4]}$$

Limited slip braking forces of the wheels are expressed by BFfl=α[G], BFfr=β[G], and BFrr=γ[G]. If values of the limited slip braking forces are limit values, formulae of Mathematical 5, 6 and 7 are established.

$$BF\!f\!l \le \alpha \quad \text{[Mathematical 5]}$$

$$BF\!f\!r \le \beta \quad \text{[Mathematical 6]}$$

$$BF\!rr \le \gamma \quad \text{[Mathematical 7]}$$

S4 computes the braking force "BFfl" of the left front wheel 3L, the braking force "BFfr" of the right front wheel 3R, and the braking force "BFrr" of the right rear wheel 4R which satisfy the formulae of Mathematical 2, 3, 4, 5, 6 and 7.

The proceeding advances to S5 after S4. S5 computes a differential gear fastening force (fastening amount, fastening rate). Specifically, S5 computes a fastening rate command value (fastening amount command value) of the electrically controlled differential gear 34 (clutch mechanism 37) based on the braking force "BFfl" of the left front wheel 3L and the braking force "BFfr" of the right front wheel 3R which are calculated in S4. S5 then outputs a command to the differential ECU 38 through the CAN 12. In this case, the fastening rate (coupling rate) of the clutch mechanism 37 is computed from the distribution of the braking forces to the right and left front wheels 3L, 3R which are computed in S4. The clutch mechanism 37 of the electrically controlled differential gear 34 is controlled, for example, at a transfer rate obtained by an expression, abnormal wheel's braking force/normal wheel's braking force×100%.

S6 implements thrust force feedback control according to a piston thrust force command value that is obtained by adding the braking force on the right front wheel side to a piston thrust force command value on the left front wheel side to which the braking force is applied in normal time. In this case, S6 computes a piston thrust force according to the braking force from a normal force obtained from a disc effective radius, a tire effective radius, pad μ, and vehicle specifications. S6 implements the thrust force feedback control, and the proceeding returns to START. In other words, the processing returns to START via END and repeats S1 and the subsequent steps.

Figure 8:
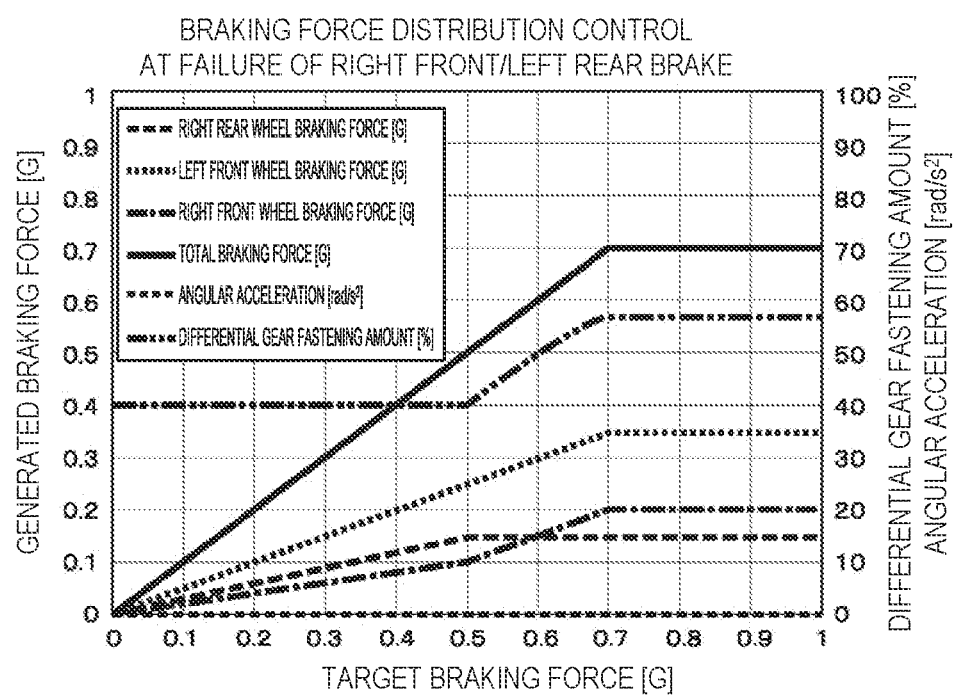
FIG. 8 is a characteristic curves showing an example of relationship of a target braking force, a generated braking force, a differential gear fastening amount, and angular acceleration.

FIG. 8 shows an example of braking force distribution in a case where the ideal braking that does not generate yaw rate is implemented. The braking force distribution between the front side and the rear side is set to 0.7 and 0.3, respectively (δ=7/3: The front wheel-side braking force is 0.7, and the rear wheel-side braking force is 0.3), and equations α=0.35 G, β=0.35 G, and γ=0.15 G are established. In this case, when the braking force is small, the fastening rate of the electrically controlled differential gear 34 (clutch mechanism 37) is 40%. The fastening rate starts increasing at a point of time when a rear wheel-side limited slip G is 0.15 G (target braking force 0.5 G). The fastening rate of the electrically controlled differential gear 34 (clutch mechanism 37) becomes about 57% when the left front wheel's limited slip G is 0.35 G (target braking force 0.7 G). The generated braking force also can be controlled without generating yaw rate up to 0.7 G, so that a sufficient braking force can be generated in the event of failure in one line of the brake system.

Figure 6:
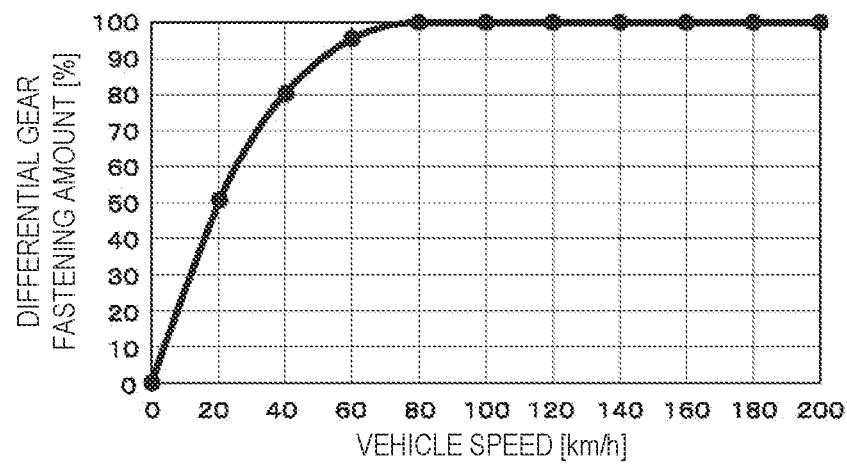
FIG. 6 is a characteristic curves showing an example of relationship between vehicle speed and a differential gear fastening amount.
Figure 7:
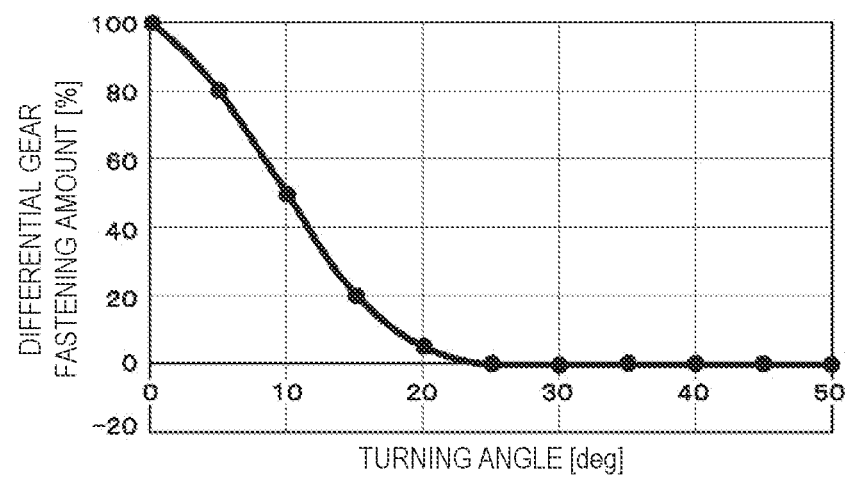
FIG. 7 is a characteristic curves showing an example of relationship between turning angle and a differential gear fastening amount.

If a braking force of 0.7 G or larger is required, it is possible to increase the braking force on the premise that steering correction is made. If the electrically controlled differential gear 34 (clutch mechanism 37) is fastened, and a steering device is operated (turned), the vehicle 1 becomes difficult to turn. When the vehicle runs at low speed for entering into a garage or making a turn at an intersection which requires a large steering amount, a braking force required is small, so that it is desirable not to fasten the electrically controlled differential gear 34 (clutch mechanism 37). In short, when the required braking force is small, the differential operation does not have to be limited. It is desirable, for example, to implement select low control on a differential gear fastening amount that is obtained in FIGS. 6 and 7. FIG. 6 shows an example of relationship between vehicle speed and the differential gear fastening amount. FIG. 7 shows an example of relationship between turning angle and the differential gear fastening amount. The differential gear shifts to an open differential with decrease of the differential gear fastening amount and shifts to a locked differential with increase of the differential gear fastening amount. The select low control selects a smaller fastening amount between a fastening amount according to current vehicle speed and a fastening amount according to a turning angle and then fastens the electrically controlled differential gear 34 (clutch mechanism 37) by the selected fastening amount. As described above, a level of the differential limitation can be adjusted according to relationship (characteristic map on FIG. 6 or FIG. 7) which is preset on the basis of the vehicle speed and the turning angle (steering angle, turning state).

As shown in FIG. 8, according to the embodiment, the second ECU 11 (control portion 11A) outputs a command (differential limiting control command) to the differential ECU 38 so that the level of differential limitation (fastening amount) of the electrically controlled differential gear 34 (clutch mechanism 37) varies according to magnitude of the physical amount (stroke amount, for example) relating to the required braking force (target braking force). In this case, as shown in FIG. 8, the second ECU 11 (control portion 11A) outputs the command (differential limiting control command) to the differential ECU 38 so that the level of the differential limitation (fastening amount) of the electrically controlled differential gear 34 (clutch mechanism 37) becomes higher (approaches a locked state) with increase of the target braking force (stroke amount).

As shown in FIG. 6, the second ECU 11 (control portion 11A) outputs the command (differential limiting control command) to the differential ECU 38 so that the level of the differential limitation (fastening amount) of the electrically controlled differential gear 34 (clutch mechanism 37) varies according to magnitude of the speed (vehicle speed) of the vehicle 1. In this case, as shown in FIG. 6, the second ECU 11 (control portion 11A) outputs the command (differential limiting control command) to the differential ECU 38 so that the level of the differential limitation (fastening amount) of the electrically controlled differential gear 34 (clutch mechanism 37) becomes higher with increase of speed (vehicle speed) of the vehicle 1.

As shown in FIG. 7, the second ECU 11 (control portion 11A) outputs the command (differential limiting control command) to the differential ECU 38 so that the level of the differential limitation (fastening amount) of the electrically controlled differential gear 34 (clutch mechanism 37) varies according to measure of the turning angle (steering angle, steering amount) of the vehicle 1. In this case, as shown in FIG. 7, the second ECU 11 (control portion 11A) outputs the command (differential limiting control command) to the differential ECU 38 so that the level of the differential limitation (fastening amount) of the electrically controlled differential gear 34 (clutch mechanism 37) becomes lower with increase of the turning angle of the vehicle 1.

As described above, according to the embodiment, the second ECU 11 (control portion 11A) outputs the differential limiting control command to the differential ECU 38 of the electrically controlled differential gear 34 (clutch mechanism 37) based on the "information as to failure in the right front electric brake mechanism 5R" and the "physical amount (stroke amount, for example) relating to a required braking force (target braking force)." When the right front electric brake mechanism 5R fails, therefore, the braking force produced by the left front electric brake mechanism 5L can be applied not only to the left front wheel 3L but also to the right front wheel 3R through the electrically controlled differential gear 34 (clutch mechanism 37) by limiting the differential operation of the electrically controlled differential gear 34. This makes it possible to secure a function of redundancy in the electric brake mechanisms 5L, 5R. Furthermore, the motor does not have to have a dual system to secure the function of redundancy, which restrains a component cost increase.

According to the embodiment, when the information as to the failure in the right front electric brake mechanism 5R is obtained, the second ECU 11 (control portion 11A) makes the thrust force of the brake pads 27 of the left front electric brake mechanism 5L relative to the physical amount (stroke amount, for example) relating to the required braking force (target braking force) larger than when the information as to the failure is not obtained. Consequently, when the right front electric brake mechanism 5R fails, the braking force of the left front electric brake mechanism 5L relative to the physical amount relating to the required braking force becomes large, which makes it possible to apply the large braking force produced by the left front electric brake mechanism 5L to the left front wheel 3L and the right front wheel 3R.

According to the embodiment, the second ECU 11 (control portion 11A) varies the level of differential limitation of the electrically controlled differential gear 34 according to the magnitude of the physical amount (stroke amount, for example) relating to the required braking force (target braking force). This makes it possible to adjust the distribution of the braking forces to the left front wheel 3L and the right front wheel 3R which are applied by the left front electric brake mechanism 5L according to the magnitude of the physical amount relating to the required braking force.

According to the embodiment, the second ECU 11 (control portion 11A) increases the level of the differential limitation of the electrically controlled differential gear 34 with increase of the magnitude of the physical amount (stroke amount, for example) relating to the required braking force (target braking force). This makes it possible to increase the braking force of the right front wheel 3R which is applied by the left front electric brake mechanism 5L with increase of the magnitude of the physical amount relating to the required braking force.

According to the embodiment, the second ECU 11 (control portion 11A) varies the level of the differential limitation of the electrically controlled differential gear 34 according to the magnitude of the speed (vehicle speed) of the vehicle 1. This makes it possible to adjust the distribution of the braking forces to the left front wheel 3L and the right front wheel 3R which are applied by the left front electric brake mechanism 5L according to the magnitude of the speed of the vehicle 1. It is also possible to adjust the ease of turning (difficulty of turning) of the vehicle 1 which is determined by the differential limitation of the electrically controlled differential gear 34 according to the magnitude of the speed of the vehicle 1.

According to the embodiment, the second ECU 11 (control portion 11A) increases the level of the differential limitation of the electrically controlled differential gear 34 with increase of the speed of the vehicle 1. This makes it possible to increase the braking force of the right front wheel 3R which is applied by the left front electric brake mechanism 5L with increase of the speed of the vehicle 1. The level of the differential limitation is low when the speed of the vehicle 1 is low, which makes it possible to secure the ease of turning of the vehicle 1 when the vehicle 1 runs at low speed, and therefore, the braking force may be small.

According to the embodiment, the second ECU 11 (control portion 11A) varies the level of the differential limitation of the electrically controlled differential gear 34 according to the measure of the turning angle of the vehicle 1. This makes it possible to adjust the distribution of the braking forces to the left front wheel 3L and the right front wheel 3R which are applied by the left front electric brake mechanism 5L according to the measure of the turning angle of the vehicle 1. It is also possible to adjust the ease of turning (difficulty of turning) of the vehicle 1 which is determined by the differential limitation of the electrically controlled differential gear 34 according to the measure of the turning angle of the vehicle 1.

According to the embodiment, the second ECU 11 (control portion 1I A) decreases the level of the differential limitation of the electrically controlled differential gear 34 with increase of the turning angle of the vehicle 1. This makes it possible to decrease the braking force of the right front wheel 3R which is applied by the left front electric brake mechanism 5L with increase of the turning angle of the vehicle 1. The vehicle 1 can turn more easily with increase of the turning angle of the vehicle 1.

According to the embodiment, the physical amount relating to the required braking force (target braking force) is obtained on the basis of the physical amount (stroke amount) relating to the operation amount of the brake pedal 7 disposed in the vehicle 1. The second ECU 11 (control portion 11A) is thus capable of outputting the differential limiting control command to the differential ECU 38 of the electrically controlled differential gear 34 (clutch mechanism 37) based on the "information as to failure in the right front electric brake mechanism 5R" and the "physical amount (stroke amount) relating to operation amount of the brake pedal 7."

According to the embodiment, the first drive wheel is the right front wheel 3R, and the second drive wheel is the left front wheel 3L. The limitation of the differential operation of the electrically controlled differential gear 34 at failure of the right front wheel 3R-side right front electric brake mechanism 5R makes it possible to apply the braking force produced by the left front wheel 3L-side left front electric brake mechanism 5L not only to the left front wheel 3L but also to the right front wheel 3R through the clutch mechanism 37.

The embodiment has been explained, taking as an example the case where the first and second drive wheels are the right and left front wheels 3R and 3L, respectively. Instead of such a configuration, for example, the first drive wheel may be the left front wheel, and the second drive wheel may be the right front wheel. The embodiment may be applied to a rear wheel drive vehicle as well as a front wheel drive vehicle. In other words, the first drive wheel may be the left rear wheel, and the second drive wheel may be the right rear wheel. Alternatively, the first drive wheel may be the right rear wheel, and the second drive wheel may be the left rear wheel. Although the embodiment has been explained, taking the two-wheel-drive vehicle 1 as an example, the vehicle may be a four-wheel-drive vehicle.

The embodiment has been explained, taking as an example the case where the right front electric brake mechanism 5R and the left rear electric brake mechanism 6L are controlled by the control portion 10A of the first ECU 10, and the left front electric brake mechanism 5L and the right rear electric brake mechanism 6R are controlled by the control portion 11A of the second ECU 11. Instead of such a configuration, for example, the left front electric brake mechanism and the right rear electric brake mechanism may be controlled by the control portion of the first ECU, and the right front electric brake mechanism and the left rear electric brake mechanism may be controlled by the control portion of the second ECU.

The embodiment has been explained, taking as an example the case where the first ECU 10 and the second ECU 11 which are brake control ECUs each include the control portion that outputs the differential limiting control command based on the information as to the failure and the information as to the required braking force. Instead of such a configuration, for example, only either one of the first ECU 10 and the second ECU 11 (namely, the first ECU 10 or the second ECU 11) may include the control portion. The control portion may be provided not to the brake control ECU, but to another ECU, such as an ECU for an automatic brake, and an ECU for a vehicle failure occasion. In fact, the control portion may be provided to any ECU that is installed in a vehicle.

The vehicle control device, the vehicle control method, and the vehicle control system according to the aforementioned embodiments may be configured, for example, in the following modes.

According to a first mode, there is provided a vehicle control device. The vehicle control device comprises a control portion disposed in a vehicle and configured to perform calculation based on inputted information and output a calculation result. The vehicle includes a differential device disposed between a first drive wheel of the vehicle and a second drive wheel of the vehicle; a differential limiting mechanism configured to limit a differential operation of the differential device; a first electric brake mechanism configured to propel a first braking member by means of a first motor to apply a braking force to the first drive wheel; and a second electric brake mechanism configured to propel a second braking member by means of a second motor to apply a braking force to the second drive wheel. The control portion obtains information as to failure associated with actuation of the first electric brake mechanism, obtains a physical amount relating to a required braking force which is applied to the first drive wheel and the second drive wheel, and outputs a differential limiting control command for limiting a differential operation of the differential device to the differential limiting mechanism based on the information as to the failure and the physical amount relating to the required braking force.

In the first mode, the control portion outputs the differential limiting control command to the differential limiting mechanism based on the "information as to failure" and the "physical amount relating to a required braking force." Limitation of the differential operation of the differential device at failure of the first electric brake mechanism makes it possible to apply the braking force produced by the second electric brake mechanism not only to the second drive wheel but also to the first drive wheel through the differential limiting mechanism. This makes it possible to secure a function of redundancy in the electric brake mechanism. Furthermore, the motor does not have to have a dual system to secure the function of redundancy, which restrains a component cost increase.

In a second mode according to the first mode, when the information as to the failure is obtained, the control portion outputs a control command for controlling the second motor so that a thrust force of the second braking member relative to the physical amount relating to the required braking force is larger than a thrust force of the second braking member relative to the physical amount relating to the required braking force when the information as to the failure is not obtained.

In the second mode, when the information as to the failure is obtained, the thrust force of the second braking member relative to the physical amount relating to the required braking force becomes larger than when the information as to the failure is not obtained. In the event of failure of the first electric brake mechanism, therefore, the braking force of the second electric brake mechanism relative to the physical amount relating to the required braking force becomes large, and the large braking force produced by the second electric brake mechanism can be applied to the second drive wheel and the first drive wheel.

In a third mode according to the first mode, the control portion outputs the differential limiting control command so that a level of differential limitation of the differential device varies according to magnitude of the physical amount relating to the required braking force.

In the third mode, the distribution of the braking forces to the second drive wheel and the first drive wheel which are applied by the second electric brake mechanism can be adjusted according to the magnitude of the physical amount relating to the required braking force.

In a fourth mode according to the third mode, the control portion outputs the differential limiting control command so that the level of the differential limitation of the differential device becomes higher with increase of the magnitude of the physical amount relating to the required braking force.

In the fourth mode, the braking force of the first drive wheel which is applied by the second electric brake mechanism can be increased with increase of the magnitude of the physical amount relating to the required braking force.

In a fifth mode according to the first mode, the control portion outputs the differential limiting control command so that the level of the differential limitation of the differential device varies according to the magnitude of speed of the vehicle.

According to the fifth mode, the distribution of the braking forces to the second drive wheel and the first drive wheel which are applied by the second electric brake mechanism can be adjusted according to the magnitude of the speed of the vehicle. It is also possible to adjust ease of turning (difficulty of turning) of the vehicle which is determined by the differential limitation of the differential device according to the magnitude of the speed of the vehicle.

In a sixth mode according to the fifth mode, the control portion outputs the differential limiting control command so that the level of the differential limitation of the differential device becomes higher with increase of the speed of the vehicle.

According to the sixth mode, the braking force of the first drive wheel which is applied by the second electric brake mechanism can be increased with increase of the speed of the vehicle. The level of the differential limitation is low when the speed of the vehicle is low, so that the ease of turning of the vehicle is secured when the vehicle runs at low speed, and therefore, the braking force may be small.

In a seventh mode according to the first mode, the control portion outputs the differential limiting control command so that the level of the differential limitation of the differential device varies according to measure of a turning angle of the vehicle.

According to the seventh mode, the distribution of the braking forces to the second drive wheel and the first drive wheel which are applied by the second electric brake mechanism can be adjusted according to the magnitude of the turning angle of the vehicle. It is also possible to adjust ease of turning (difficulty of turning) of the vehicle which is determined by the differential limitation of the differential device according to the measure of the turning angle of the vehicle.

In an eighth mode according to the seventh mode, the control portion outputs the differential limiting control command so that the level of the differential limitation of the differential device becomes lower with increase of the turning angle of the vehicle.

According to the eighth mode, the braking force of the first drive wheel which is applied by the second electric brake mechanism can be decreased with increase of the turning angle of the vehicle. It is also possible to improve the ease of turning of the vehicle with increase of the turning angle of the vehicle.

In a ninth mode according to the first mode, the physical amount relating to the required braking force is obtained based on a physical amount relating to operation amount of a brake operation member that is disposed in the vehicle.

According to the ninth mode, the differential limiting control command can be outputted to the differential limiting mechanism based on the "information as to failure" and the "physical amount relating to operation amount of a brake operation member."

In a 10th mode according to the first mode, the first drive wheel is a right front wheel, and the second drive wheel is a left front wheel.

According to the 10th mode, the limitation of the differential operation of the differential device at failure of the first electric brake mechanism on the right front wheel side makes it possible to apply the braking force produced by the second electric brake mechanism on the left front wheel side not only to the left front wheel but also to the right front wheel through the differential limiting mechanism.

In an 11th mode, there is provided a vehicle control method for a vehicle. The vehicle comprises a differential device disposed between a first drive wheel of the vehicle and a second drive wheel of the vehicle, a differential limiting mechanism configured to limit a differential operation of the differential device, a first electric brake mechanism configured to propel a first braking member by means of a first motor to apply a braking force to the first drive wheel, and a second electric brake mechanism configured to propel a second braking member by means of a second motor to apply a braking force to the second drive wheel. The vehicle control method obtains information as to failure associated with actuation of the first electric brake mechanism, obtains a physical amount relating to a required braking force which is applied to the first drive wheel and the second drive wheel, and outputs a differential limiting control command for limiting the differential operation of the differential device to the differential limiting mechanism based on the information as to the failure and the physical amount relating to the required braking force.

According to the 11th mode, the differential limiting control command is outputted to the differential limiting mechanism based on the "information as to failure" and the "physical amount relating to a required braking force." Limitation of the differential operation of the differential device at failure of the first electric brake mechanism makes it possible to apply the braking force produced by the second electric brake mechanism not only to the second drive wheel but also to the first drive wheel through the differential limiting mechanism. This makes it possible to secure a function of redundancy in the electric brake mechanism. Furthermore, the motor does not have to have a dual system to secure the function of redundancy, which restrains a component cost increase.

In a 12th mode, a vehicle control system comprises a differential device disposed between a first drive wheel of a vehicle and a second drive wheel of the vehicle, a differential limiting mechanism configured to limit a differential operation of the differential device, a first electric brake mechanism configured to propel a first braking member by means of a first motor to apply a braking force to the first drive wheel, and a second electric brake mechanism configured to propel a second braking member by means of a second motor to apply a braking force to the second drive wheel, and a controller configured to obtain information as to failure associated with actuation of the first electric brake mechanism, obtain a physical amount relating to a required braking force which is applied to the first drive wheel and the second drive wheel, and output a differential limiting control command for limiting the differential operation of the differential device to the differential limiting mechanism based on the information as to the failure and the physical amount relating to the required braking force.

According to the 12th mode, the controller outputs the differential limiting control command to the differential limiting mechanism based on the "information as to failure" and the "physical amount relating to a required braking force." Limitation of the differential operation of the differential device at failure of the first electric mechanism makes it possible to apply a braking force produced by the second electric brake mechanism not only to the second drive wheel but also to the first drive wheel through the differential limiting mechanism. This makes it possible to secure a function of redundancy in the electric brake mechanism. Furthermore, the motor does not have to have a dual system to secure the function of redundancy, which restrains a component cost increase.

The invention is not limited to the embodiments discussed above and may be modified in various manners. For example, the embodiments are explained to clearly describe the invention in details and do not necessarily have to include all the configurations mentioned above. It is possible to partially replace the constitution of any of the embodiments with that of another embodiment and also incorporate the constitution of any of the embodiments into that of another embodiment. The constitution of any of the embodiments may be partially combined or replaced with the constitution of another embodiment or may be deleted.

The present patent application claims priority under Japanese Patent Application No. 2020-005812 filed on Jan. 17, 2020. The entire disclosure of Japanese Patent Application No. 2020-005812 filed on Jan. 17, 2020 including the description, claims, drawings and abstract is incorporated herein by reference in its entirety.

REFERENCE SIGN LIST

1 Vehicle; 3L Left front wheel (drive wheel, second drive wheel); 3R Right front wheel (drive wheel, first drive wheel); 4L, 4R Rear wheel; 5L Left front electric brake mechanism (electric brake mechanism, second electric brake mechanism); 5R Right front electric brake mechanism (electric brake mechanism, first electric brake mechanism); 6L. 6R Rear wheel-side electric brake mechanism; 7 Brake pedal (brake operation member); 10 First ECU (vehicle control device, controller); 10A Control portion; 11 Second ECU (vehicle control device, controller); 11A Control portion; 23 Electric motor (motor, first motor, second motor); 27 Brake pad (braking member, first braking member, second braking member); 34 Electrically controlled differential gear (differential device); 37 Clutch mechanism (differential limiting mechanism), 38 Differential ECU

The invention claimed is:

1. A vehicle control device, the vehicle control device comprising:
a control portion disposed in a vehicle and configured to perform calculation based on inputted information and output a calculation result,
the vehicle including:
a differential device disposed between a first drive wheel of the vehicle and a second drive wheel of the vehicle;
a differential limiting mechanism configured to limit a differential operation of the differential device;
a first electric brake mechanism configured to propel a first braking member by means of a first motor to apply a braking force to the first drive wheel; and
a second electric brake mechanism configured to propel a second braking member by means of a second motor to apply a braking force to the second drive wheel,
the control portion being configured to:
obtain information as to failure associated with actuation of the first electric brake mechanism,
obtain a physical amount relating to a required braking force which is applied to the first drive wheel and the second drive wheel, and
output a differential limiting control command for limiting a differential operation of the differential device to the differential limiting mechanism based on the information as to the failure and the physical amount relating to the required braking force.

2. The vehicle control device according to claim 1, wherein when the information as to the failure is obtained, the control portion outputs a control command for controlling the second motor so that a thrust force of the second braking member relative to the physical amount relating to the required braking force is larger than a thrust force of the second braking member relative to the physical amount relating to the required braking force when the information as to the failure is not obtained.

3. The vehicle control device according to claim 1, wherein the control portion outputs the differential limiting control command so that a level of differential limitation of the differential device varies according to magnitude of the physical amount relating to the requires braking force.

4. The vehicle control device according to claim 3, wherein the control portion outputs the differential limiting control command so that the level of the differential limitation of the differential device becomes higher with increase of the magnitude of the physical amount relating to the required braking force.

5. The vehicle control device according to claim 1, wherein the control portion outputs the differential limiting control command so that the level of the differential limitation of the differential device varies according to magnitude of speed of the vehicle.

6. The vehicle control device according to claim 5, wherein the control portion outputs the differential limiting control command so that the level of the differential limitation of the differential device becomes higher with increase of the speed of the vehicle.

7. The vehicle control device according to claim 1, wherein the control portion outputs the differential limiting control command so that a level of differential limitation of the differential device varies according to measure of a turning angle of the vehicle.

8. The vehicle control device according to claim 7, wherein the control portion outputs the differential limiting control command so that the level of the differential limitation of the differential device becomes lower with increase of the turning angle of the vehicle.

9. The vehicle control device according to claim 1, wherein the physical amount relating to the required braking force is obtained based on a physical amount relating to operation amount of a brake operation member disposed in the vehicle.

10. The vehicle control device according to claim 1, wherein the first drive wheel is a right front wheel, and the second drive wheel is a left front wheel.

11. A vehicle control method for a vehicle, the vehicle including:
a differential device disposed between a first drive wheel of the vehicle and a second drive wheel of the vehicle;
a differential limiting mechanism configured to limit a differential operation of the differential device;
a first electric brake mechanism configured to propel a first braking member by means of a first motor to apply a braking force to the first drive wheel; and
a second electric brake mechanism configured to propel a second braking member by means of a second motor to apply a braking force to the second drive wheel,
the vehicle control method being configured to:
obtain information as to failure associated with actuation of the first electric brake mechanism,
obtain a physical amount relating to a required braking force which is applied to the first drive wheel and the second drive wheel, and
output a differential limiting control command for limiting a differential operation of the differential device to the differential limiting mechanism based on the information as to the failure and the physical amount relating to the required braking force.

12. A vehicle control system, the vehicle control system comprising:
a differential device disposed between a first drive wheel of a vehicle and a second drive wheel of the vehicle;
a differential limiting mechanism configured to limit a differential operation of the differential device;
a first electric brake mechanism configured to propel a first braking member by means of a first motor to apply a braking force to the first drive wheel;
a second electric brake mechanism configured to propel a second braking member by means of a second motor to apply a braking force to the second drive wheel, and
a controller,
the controller being configured to obtain information as to failure associated with actuation of the first electric brake mechanism,
obtain a physical amount relating to a required braking force which is applied to the first drive wheel and the second drive wheel, and
output a differential limiting control command for limiting a differential operation of the differential device to the differential limiting mechanism based on the information as to the failure and the physical amount relating to the required braking force.

* * * * *